United States Patent
Lee et al.

(10) Patent No.: US 11,773,194 B2
(45) Date of Patent: Oct. 3, 2023

(54) VINYL CHLORIDE-BASED POLYMER AND METHOD FOR PREPARING SAME

(71) Applicant: LG CHEM, LTD., Seoul (KR)

(72) Inventors: Kwang Jin Lee, Daejeon (KR); Yang Jun Jeon, Daejeon (KR); Jae Hyun Park, Daejeon (KR); Hyun Kyou Ha, Daejeon (KR)

(73) Assignee: LG CHEM, LTD., Seoul (KR)

( * ) Notice: Subject to any disclaimer, the term of this patent is extended or adjusted under 35 U.S.C. 154(b) by 295 days.

(21) Appl. No.: 17/058,104

(22) PCT Filed: Oct. 28, 2019

(86) PCT No.: PCT/KR2019/014276
§ 371 (c)(1),
(2) Date: Nov. 23, 2020

(87) PCT Pub. No.: WO2020/091342
PCT Pub. Date: May 7, 2020

(65) Prior Publication Data
US 2021/0214474 A1    Jul. 15, 2021

(30) Foreign Application Priority Data
Oct. 29, 2018 (KR) .................. 10-2018-0129865

(51) Int. Cl.
*C08F 14/06* (2006.01)
*C08K 3/26* (2006.01)
*C08K 5/12* (2006.01)

(52) U.S. Cl.
CPC ............ *C08F 14/06* (2013.01); *C08K 3/26* (2013.01); *C08K 5/12* (2013.01); C08K 2003/262 (2013.01)

(58) Field of Classification Search
CPC ...... C08F 14/06; C08K 3/26; C08K 2003/262
See application file for complete search history.

(56) References Cited

U.S. PATENT DOCUMENTS

| | | |
|---|---|---|
| 3,049,521 A | 8/1962 | Burkholder |
| 3,575,945 A | 4/1971 | Cantoni et al. |
| 6,242,541 B1 | 6/2001 | Hohenadel et al. |
| 2010/0267912 A1 | 10/2010 | Ahn et al. |
| 2016/0304636 A1 | 10/2016 | Youk et al. |
| 2016/0369018 A1 | 12/2016 | Youk et al. |
| 2018/0016371 A1 | 1/2018 | Lee et al. |

FOREIGN PATENT DOCUMENTS

| | | | | |
|---|---|---|---|---|
| CN | 1217344 A | 5/1999 | | |
| CN | 101506249 A | 8/2009 | | |
| CN | 102453176 A | 5/2012 | | |
| CN | 105916893 A | 8/2016 | | |
| CN | 107540770 A | 1/2018 | | |
| CN | 108586969 A | * 9/2018 | ............ | C08F 114/06 |
| CN | 108586969 A | 9/2018 | | |
| DE | 205439 A1 | 12/1983 | | |
| JP | H1067807 A | 3/1998 | | |
| JP | 2001026620 A | 1/2001 | | |
| JP | 2002226505 A | 8/2002 | | |
| JP | 2004224838 A | * 8/2004 | ............ | C08F 14/00 |
| KR | 2009-0020237 A | 2/2009 | | |
| KR | 2011-0008882 A | 1/2011 | | |
| KR | 20110070016 A | 6/2011 | | |
| KR | 20110070016 A | * 6/2011 | ............ | C08F 14/06 |
| KR | 2013-0085750 A | 7/2013 | | |
| KR | 101310524 B1 | 9/2013 | | |
| KR | 20150036870 A | 4/2015 | | |
| KR | 20160035544 A | 3/2016 | | |
| KR | 20170041548 A | 4/2017 | | |
| KR | 20180047361 A | 5/2018 | | |
| WO | 2012-038084 A1 | 3/2012 | | |

OTHER PUBLICATIONS

JP2004224838A English Translation (Year: 2004).*
KR20110070016A English Translation (Year: 2011).*
CN108586969A (Year: 2018).*
Yin LV, et al., "Construction of chain segment structure models, and effects on the initial stage of the thermal degradation of poly(vinyl chloride)", Royal Society of Chemistry, RSC Advances., 2017, 7,37268-37275.
Database CA[Online] Chemical Abstracts Service, Columbus, Ohio, US; Song, Xiaoling et al: "Method for preparing polyvinyl chloride/nano calcium", XP002803755 (2 Pages).
Database CA[Online] Chemical Abstracts Service, Columbus, Ohio, US; Bao, Chunwei et al: "Method for preparation of poly(vinyl chloride) with low rate", XP002803756 (2 Pages).

* cited by examiner

*Primary Examiner* — Ling Siu Choi
*Assistant Examiner* — Huihong Qiao
(74) *Attorney, Agent, or Firm* — Bryan Cave Leighton Paisner LLP

(57) ABSTRACT

The present disclosure relates to a vinyl chloride-based polymer having a pH of 7 to 11 and satisfying the number of olefin-type defects ($N_O$) of 1.5 or less and the number of chloro-type defects ($N_C$) of 11.0 or less. The vinyl chloride-based polymer contains reduced defects in the entire polymer and may suppress dehydrochlorination reaction or crosslinking reaction during processing, and effects of preventing discoloration phenomenon, improving heat resistance and preventing the deterioration of physical properties may be expected.

10 Claims, No Drawings

VINYL CHLORIDE-BASED POLYMER AND METHOD FOR PREPARING SAME

CROSS-REFERENCE TO RELATED APPLICATIONS

This application is a National Stage Application of International Application No. PCT/KR2019/014276, filed Oct. 28, 2019 which claims priority to and the benefits of priority based on Korean Patent Application No. 10-2018-129865, filed on Oct. 29, 2018, the entire contents of which are incorporated herein by reference.

TECHNICAL FIELD

The present disclosure relates to a vinyl chloride-based polymer with markedly decreased defects and a method for preparing the same.

BACKGROUND ART

A vinyl chloride-based polymer is a polymer including 50% or more of repeated units derived from a vinyl chloride monomer (VCM), cheap and easy to control the hardness thereof, and applicable in most processing instruments, and thus, has various application fields. In addition, since a molded article having excellent physical and chemical properties, for example, mechanical strength, weather resistance, chemical resistance, etc., may be provided, the vinyl chloride-based polymer is widely used in various fields.

Meanwhile, a vinyl chloride-based resin is a material for living and industry and is a general-purpose resin which is the most widely used in the world. Generally, a straight vinyl chloride-based resin is prepared as particulate particles with a size of about 100-200 µm by a suspension polymerization method, and a paste vinyl chloride-based resin is prepared as particulate particles with a size of about 0.1-2 µm by an emulsion polymerization method.

Generally, the paste vinyl chloride-based resin is obtained by drying latex obtained by emulsion polymerization by a spray drying method to form final resin particles, and dispersing the particles in a solvent or a plasticizer, and then is applied to products such as flooring materials, wall papers, tarpaulins, raincoats, gloves, car underbody coatings, and carpet tiles, through processes such as coating (reverse roll-coating, knife coating, screen coating, spray coating), gravure and screen printing, rotation casting, and shell casting and dipping.

However, dehydrochlorination is generated from the vinyl chloride-based polymer by heat or ultraviolet rays applied during processing due to the generation of chemical structural defects during polymerization reaction, and thus, discoloration of a resin may be induced, or the physical properties thereof may be degraded.

Particularly, in the vinyl chloride-based polymer, chemical defects generated during polymerization reaction, i.e., chemical structural defects such as allyl chloride and tertiary chlorine may be present in the vinyl chloride-based polymer, and due to the chemical structural defects, the bonding energy of carbon and chlorine in the vinyl chloride-based polymer is a very low value than the bonding energy of carbon and chlorine in a normal molecular structure, and the bond of carbon and chlorine is easily cleaved during processing the vinyl chloride-based polymer due to external radical transfer, and hydrogen chloride separated from a molecular chain accelerates novel side reaction by autocatalyst reaction, thereby continuously generating hydrogen chloride. In addition, an unsaturated bond is formed at a position where the hydrogen chloride has left, and through the overlap of several unsaturated bonds, problems of generating discoloration of a resin and deteriorating physical properties arise. That is, dehydrochlorination (hydrogen chloride) reaction may be generated in a vinyl chloride-based polymer or a processed molded article therefrom by heat or ultraviolet rays, and as a result, problems of discoloration of the vinyl chloride-based polymer itself of deterioration or changing of physical properties arise.

In order to solve such problems of the vinyl chloride-based polymer, an organometal compound containing a metal such as Ba, Zn, Ca and Pb is mixed with the vinyl chloride-based polymer to restrain the generation of radicals or ions produced during the thermal decomposition of the vinyl chloride-based polymer and to control the thermal decomposition rate of a resin. Recently, a method of using various types of metal-based or organic compound-based thermal stabilizers has been introduced, but due to environmental issues induced during using a heavy metal stabilizer and high prices, the use thereof is under a lot of restrictions.

In Korean Laid-open Patent Publication No. 10-2017-0041548, a silicate compound is injected during polymerizing a vinyl chloride-based polymer so that a derived unit from the silicate compound is present in the polymer to improve thermal stability, but there are problems of increasing turbidity due to mineral components during manufacturing a transparent product.

In addition, a method for supplementing weak physical properties by blending a polymer having excellent heat resistance, etc. with a vinyl chloride-based polymer has been suggested, but due to low miscibility with the vinyl chloride-based polymer, it is hard to process, and the method is not advantageously used.

Accordingly, the development of a technique effectively improving the thermal stability of a vinyl chloride-based polymer is necessary.

PRIOR ART DOCUMENT

Patent Document (Patent Document 1) Korean Laid-open Patent Publication No. 10-2017-0041548

DISCLOSURE OF THE INVENTION

Technical Problem

The present invention is devised to solve the problems of the conventional technique and provides a vinyl chloride-based polymer with decreased defects in the polymer and improved heat resistance through injecting a carbonate-based metal salt to a composition for polymerization and controlling injection in a suitable amount until a certain point, and provides a method for preparing same.

Technical Solution

According to an embodiment of the present invention to solve the above tasks, there is provided in the present invention a vinyl chloride-based polymer having a pH of 7 to 11 and satisfying the following Formulae 1 and 2:

$N_O \leq 1.5$         [Formula 1]

$N_C \leq 11.0$        [Formula 2]

In Formulae 1 and 2, $N_O$ is a number of olefin-type defects per 1,000 vinyl carbon atoms in the polymer, $N_C$ is a number of chloro-type defects per 1,000 vinyl carbon atoms in the polymer, and $N_O$ and $N_C$ are values calculated by integrating peaks derived by NMR analysis.

Advantageous Effects

In the present invention, defects present in the vinyl chloride-based polymer may be significantly reduced through the application of a preparation method using a carbonate-based metal salt, and accordingly, the vinyl chloride-based polymer with markedly improved heat resistance may be provided.

BEST MODE FOR CARRYING OUT THE INVENTION

It will be understood that words or terms used in the description and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

Definition of Terms

The term "polymer" used in the present disclosure refers to a polymer compound prepared by polymerizing monomers, irrespective of the same or different kinds. Like this, a general term polymer comprehensively include a homopolymer which is commonly used to refer to a polymer prepared from only one kind of monomer, and an interpolymer as defined below.

The term "vinyl chloride-based polymer" used in the present disclosure represents all compounds produced by polymerizing a vinyl chloride-based monomer and may mean a polymer chain derived from a vinyl chloride-based monomer.

The term "plastisol" used in the present disclosure represents a mixture of a resin and a plasticizer so as to mold, cast or process into a continuous film phase by heating, for example, may represent a paste phase obtained by mixing a vinyl chloride-based polymer and a plasticizer.

The term "composition" used in the present disclosure includes a mixture of materials including a corresponding composition as well as a reaction product formed from the materials of the corresponding composition and the decomposition product of the corresponding composition.

The term "defect" used in the present disclosure means a part including an unintended functional group as a unit generated by excess reaction, unreaction or side reaction between monomers other than repeating units present in the main chain of a polymer, and the functional group may be referred to as "defect" and may include an unsaturated bond and/or saturated chloro alkyl.

The term "vinyl carbon" used in the present disclosure may mean carbon derived from a vinyl chloride monomer present in a vinyl chloride-based polymer chain.

The term "chloro-type defect" used in the present disclosure means not carbon-chlorine defect present in "—$CH_2$—CHCl—" which is a main repeating unit in a vinyl chloride-based polymer chain but means defect having a carbon-chlorine bond present in other part which is not included in the main repeating unit, and is a general term of unintended functional group.

The term "olefin-type defect" used in the present disclosure means a carbon-carbon double bond present in a vinyl chloride-based polymer chain, may include all double bonds included at the terminal of and in the polymer chain, and may mean the presence of both cis and trans isomers.

The term "pseudo-terminal" used in the present disclosure may mean the presence at a position within three atoms from the terminal carbon of a vinyl chloride-based polymer chain.

Hereinafter, the present invention will be explained in more detail to assist the understanding of the present invention.

The vinyl chloride-based polymer according to an embodiment of the present invention has the pH of the polymer of 7 to 11 and satisfies the following Formulae 1 and 2:

$$N_O \leq 1.5 \quad \text{[Formula 1]}$$

$$N_C \leq 11.0 \quad \text{[Formula 2]}$$

In Formulae 1 and 2, $N_O$ is a number of olefin-type defects per 1,000 vinyl carbon atoms in the polymer, $N_C$ is a number of chloro-type defects per 1,000 vinyl carbon atoms in the polymer, and $N_O$ and $N_C$ are values calculated by integrating peaks derived by NMR analysis.

According to the present invention, the vinyl chloride-based polymer may have extremely decreased defects, and the above-described chemical structural defects may mean various types of unsaturated bonds and various types of saturated chloro alkyl groups, present in a vinyl chloride-based polymer.

Particularly, the olefin-type defects may mean all double bonds present in the vinyl chloride-based polymer. The number of the olefin-type defects ($N_O$) is 1.5 or less as in Formula 1, preferably, 1.45 or less, or 1.4 or less, more preferably, 1.35 or less.

The olefin-type defect, for example, may generally include "pseudo-terminal trans-type defect" which is a double bond derived from carbon immediately in front of terminal carbon as the nearby of the terminal of a polymer chain and is present as a trans double bond type, "pseudo-terminal cis-type defect" which has a structural isomer relation with respect to the trans-type and is present as a cis double bond type, "terminal olefin defect" present at the terminal carbon of a polymer chain, and "inner olefin defect" present not at the terminal but in the middle portion of a polymer chain.

For the olefin-type defect, for example, without limitation, the pseudo-terminal trans-type defect may be represented by Formula 1 below, the pseudo-terminal cis-type defect may be represented by Formula 2 below, the terminal olefin defect may be represented by Formula 3 below, and the inner olefin defect may mean all types of olefin defects which are not present not at terminal and pseudo-terminal but at an inner part.

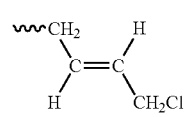

[Formula 1]

[Formula 2]

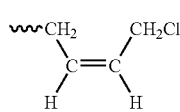

[Formula 3]

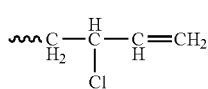

The inner olefin defect among the olefin-type defects is one of causes which may arise big problems in heat resistance due to the presence of a double bond structure in the polymer, and it is important to control polymerization so that the number of such defects is not generated if possible. The number decrease of such olefin-type defects may be substantially accompanied with the decrease of the inner olefin defects, but the reducing factor of heat resistance is not limited only to the inner olefin defects, but the number of other olefin-type defects may also be required to decrease at the same time.

In addition, the chloro-type defect generally refers to a functional group having a carbon-chlorine bond which is not the carbon-chlorine bond of a main repeating unit as described above, and as in Formula 2, the number of the chloro-type defects may be 11.0 or less, preferably, 10.5 or less, more preferably, 10.0 or less.

The chloro-type defect may generally include, for example, "branch-type chloro defect" not including a carbon-chlorine bond derived from the carbon of a main chain but including a carbon-chlorine bond derived from the branched carbon of a main chain, while present in the polymer chain, "terminal symmetry-type chloro defect" of a meso type, including two continuous carbon-chlorine bonds from the terminal carbon of a polymer chain and having a symmetry plane, "terminal asymmetry-type chloro defect" of a racemic type, in which a symmetry plane is not present, and "terminal chloro defect" having a carbon-chlorine bond derived from the terminal carbon of a polymer chain.

In the chloro-type defects, for example, the branch-type chloro defect may be represented by Formula 4 below, the terminal symmetry-type chloro defect may be represented by Formula 5 below, the terminal asymmetry-type chloro defect may be represented by Formula 6 below, and the terminal chloro defect may be represented by Formula 7 below, without limitation.

[Formula 4]

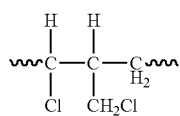

[Formula 5]

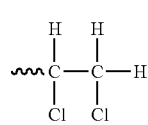

[Formula 6]

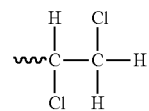

[Formula 7]

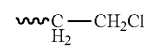

As described above, if the defects in the vinyl chloride-based polymer are low, effects of excellent processability and markedly improved heat resistance may be expected.

Particularly, if the olefin-type defects are decreased to 1.6 or less per 1,000 vinyl carbon atoms in the polymer, the discoloration phenomenon or deterioration of mechanical properties and compounding properties, generated due to the overlap of double bonds may be prevented, and finally, heat resistance may be improved.

In addition, if the chloro-type defects are decreased to 11 or less per 1,000 vinyl carbon atoms in the polymer, carbon-chlorine bonds in other than the main chain of a vinyl chloride-based polymer may decrease, bonding energy becomes low, easy separation of hydrogen chloride due to external radical reaction by heat or ultraviolet rays during processing may be prevented, propagational dehydrochlorination reaction which is generated by the auto-catalyst reaction of the separated hydrogen chloride or a double bond produced at the separated site may be restrained, and effects of preventing the deterioration of physical properties, improving heat resistance and improving processability may be obtained.

According to the present invention, the vinyl chloride-based polymer may obtain the above-described effects with small numbers of olefin-type defects and chloro-type defects in the polymer, and further, the vinyl chloride-based polymer may satisfy the following Formula 3:

$$R_{OT} \geq 0.45 \quad \text{[Formula 3]}$$

In Formula 3, $R_{OT}$ is a ratio ($N_{OT}/N_O$) of a number of pseudo-terminal trans-type defects ($N_{OT}$) with respect to the number of olefin-type defects per 1,000 vinyl carbon atoms in the polymer ($N_O$), and $N_O$ and $N_{OT}$ are values calculated by integrating peaks derived by NMR analysis.

The number of olefin-type defects ($N_O$) may be a total value of the number of inner olefin defects ($N_{OI}$), the number of pseudo-terminal trans-type defects ($N_{OT}$), the number of pseudo-terminal cis-type defects ($N_{OC}$) and the number of terminal olefin defects ($N_T$), and the number of the defects is the number present per 1,000 vinyl carbon atoms in the polymer. $R_{OT}$ expressed in Formula 3 may be able to show the ratio occupied by the pseudo-terminal trans-type defects among total olefin-type defects.

If the vinyl chloride-based polymer according to the present invention has the ratio of the pseudo-terminal trans-type defects among the total olefin-type defects in the polymer of greater than 0.45 as in Formula 3, the above-described effects may be further maximized, particularly, effects of improving heat resistance may be shown.

Particularly, if the ratio of the pseudo-terminal trans-type defects is kept to a specific range or more while decreasing the total amount of the olefin-type defects, the improvement of the above-described effects may be further achieved.

The vinyl chloride-based polymer according to the present invention may further satisfy the following Formula 4:

$$R_{CM} \geq 0.22 \qquad \text{[Formula 4]}$$

In Formula 4, $R_{CM}$ is a ratio ($N_{CM}/N_C$) of a number of terminal symmetry-type chloro defects ($N_{CM}$) with respect to the number of chloro-type defects per 1,000 vinyl carbon atoms in the polymer ($N_C$), and $N_C$ and $N_{CM}$ are values calculated by integrating peaks derived by NMR analysis.

The number of chloro-type defects ($N_C$) may be a total value of the number of branch-type chloro defects ($N_{CB}$), the number of terminal symmetry-type chloro defects ($N_{CM}$), the number of terminal asymmetry-type chloro defects ($N_{CR}$) and the number of terminal chloro defects ($N_{CT}$), and the number of the defects is the number present per 1,000 vinyl carbon atoms in the polymer. RCM expressed in Formula 4 may be able to show the ratio occupied by the terminal symmetry-type chloro defects among total chloro-type defects, and if $R_{CM}$ is greater than 0.22, the above-described effects may be further maximized.

Particularly, if the ratio of the terminal symmetry-type chloro defects is kept to a specific range or more while decreasing the total amount of the chloro-type defects, the improvement of the above-described effects may be further achieved.

The above-described olefin-type defects and chloro-type defects may be computed through NMR measurement. The computation through a NMR analysis apparatus may be conducted by measuring NMR 1H spectrum, scanning 1,000 times or more considering the number of defects of a vinyl chloride-based polymer, and calculating the number of defects per 1000 vinyl carbon atoms based on the peak integration value of the measured NMR 1H spectrum.

The vinyl chloride-based polymer according to the present invention has pH of 7 to 11. If the pH of the polymer prepared is less than 7, it may mean that the chloro-type defects and the olefin-type defects are a lot, and it is apprehended that the possibility of arising side reactions with other additives during processing is increased due to the low pH and as a result, defects may be additionally generated. In addition, if the pH of the polymer is greater than 11, over-foaming phenomenon may arise during processing a foam, the density of a foam cell may be bad, and its surface may get rough.

The pH of the vinyl chloride-based polymer may be obtained by drying a polymer latex, mixing deionized water and a polymer powder and measuring the pH of the mixture through a pH measuring instrument. The pH of the polymer may be controlled by a preparation method which will be described later. At last, if the pH of the polymer satisfies the range of 7 to 11, the number of olefin-type defects and chloro-type defects may also be decreased, the possibility of satisfying the range of the Formulae may be increased, and thus, a vinyl chloride-based polymer having a certain degree or more of mechanical properties and excellent heat resistance may be provided.

According to an embodiment of the present invention, the method for preparing a vinyl chloride-based polymer includes a step of polymerizing a polymerization mixture including polywater, an initiator, an emulsifier, a vinyl chloride monomer and a carbonate-based metal salt, the pH of the polymerization mixture is 8 or more, the carbonate-based metal salt is injected in the initial stage of polymerization, and the initial stage of polymerization is a point before initiating polymerization to a point where a polymerization conversion ratio becomes 10%.

The method for preparing a vinyl chloride-based polymer according to an embodiment of the present invention may be initiated from the control of the pH of the polymerization mixture to 8 or more, and may be accomplished through the injection of the carbonate-based metal salt to the polymerization mixture.

The carbonate-based metal salt plays the role of controlling the pH of the polymerization mixture, may be a material increasing the pH to a certain degree, and may particularly include one or more selected from the group consisting of $Na_2CO_3$, $NaHCO_3$ and $K_2CO_3$. The injection of a material decreasing the pH may induce significant increase of the number of defects due to the decrease of the pH undesirably, and the pH of the mixture of polymerization reaction may be controlled to 8 or more by using the carbonate-based metal salt as a buffer agent.

The carbonate metal salt may be injected in an amount of 100 to 1500 ppm, preferably, 200 ppm or more, 300 ppm or more, and 1300 ppm or less, 1200 ppm or less, 1000 ppm or less or 800 ppm or less based on the total weight of the vinyl chloride monomer. With the amount of the carbonate-based metal salt in the range, the pH of the mixture may be controlled to pH 8 or more, and in addition, the number of olefin-type defects and chloro-type defects in a final polymer may be significantly decreased.

In addition, it may be effective that the carbonate-based metal salt is injected in the initial stage of polymerization, particularly, from a point before counting a conversion ratio of 0% to a point where a polymerization conversion ratio is within 10%. In other words, polymerization may be initiated after injecting a carbonate-based metal salt to a polymerization mixture, the injection may be performed at a point where a conversion ratio is 0%, which is immediately after initiating polymerization, to 10%, and an injection method is not specifically limited and includes continuous injection, partitive injection, injection in batch, etc. If the injection is performed with an amount satisfying the above-described amount at the above-mentioned point, the above-described effects may be achieved.

As described above, if a vinyl chloride-based polymer is prepared while satisfying the above-described conditions, and reaction conditions are suitably controlled, the number of defects of a final vinyl chloride-based polymer may be decreased, particularly, the ratio of pseudo-terminal trans-type defects among olefin-type defects may be maintained, and the ratio of terminal symmetry-type chloro defects among chloro-type defects may be maintained, thereby contributing to the significant increase of heat resistance.

As the method for preparing a vinyl chloride-based polymer, common polymerization methods used in the technical field may be conducted, particularly, polymerization reaction may be performed by pure emulsion polymerization. Hereinafter, a polymerization method excluding the injection of a carbonate-based metal salt will be explained.

The polymerization may be performed by injecting a vinyl chloride-based monomer, a water-soluble polymerization initiator, polywater, etc. to a vacuum reactor filled with a first emulsifier, and reacting at a temperature of 30° C. to 70° C., and once the polymerization reaction is initiated, a buffer agent may be injected as described above, and the buffer agent may be injected at a point where a polymerization conversion ratio is 0% to less than 20%. In addition, a second emulsifier may be additionally injected separately from the first emulsifier during polymerization, and the second emulsifier may be continuously injected during polymerization.

The reactor filled with the mixture of a first emulsifier and a water-soluble polymerization initiator represents a reactor containing a mixture including the first emulsifier and the water-soluble polymerization initiator, and the mixture may further include an additive such as polywater, a dispersant, a reaction suppressor, a molecular weight controller and an electrolyte in addition to the first emulsifier and the water-soluble polymerization initiator.

The first emulsifier may be used in 0.02 parts by weight to 0.4 parts by weight based on 100 parts by weight of the vinyl chloride-based monomer, and as the first emulsifier, for example, alkyl sulfonates such as sodium lauryl sulfate, lauryl benzene sulfonic acid, alpha-olefin sulfonate, sodium dodecyl benzene sulfonate, sodium lauryl ethoxylated sulfate, sodium octadecyl sulfate, and sodium lauryl ether sulfate, linear chain alkylbenzene sulfonate, or the like may be applied.

The water-soluble polymerization initiator may be used in 0.01 parts by weight to 2.0 parts by weight based on 100 parts by weight of the vinyl chloride-based monomer, and the water-soluble polymerization initiator may be one or more selected from the group consisting of potassium persulfate, ammonium persulfate and hydrogen peroxide.

In addition, the second emulsifier is continuously injected into the reactor during polymerization and may be used in 0.01 parts by weight to 6 parts by weight based on 100 parts by weight of the vinyl chloride-based monomer. As the second emulsifier, alkyl sulfonates such as sodium lauryl sulfate, lauryl benzene sulfonic acid, alpha-olefin sulfonate, sodium lauryl ethoxylated sulfate, sodium octadecyl sulfate, and sodium lauryl ether sulfate, linear chain alkylbenzene sulfonate, or the like may be applied, and the second emulsifier may be the same as the first emulsifier or different therefrom. If the first emulsifier and the second emulsifier are the same material, the expressions of the first and the second is to distinguish the injection order of the emulsifiers.

In addition, the polywater may be included in 70 parts by weight to 120 parts by weight based on 100 parts by weight of the vinyl chloride-based monomer.

Here, the vinyl chloride-based monomer may mean a vinyl chloride monomer alone, or a mixture of a vinyl chloride monomer and a vinyl-based monomer which is capable of copolymerizing therewith. That is, the vinyl chloride-based polymer according to an embodiment of the present invention may be a homopolymer of vinyl chloride, a copolymer of a vinyl chloride monomer and a vinyl-based monomer which is copolymerizable therewith. If the vinyl chloride-based polymer is the copolymer, vinyl chloride may be included in 50% or more.

The vinyl-based monomer which is copolymerizable with the vinyl chloride-based monomer is not specifically limited. For example, olefin compounds such as ethylene, propylene and butene, vinyl esters such as vinyl acetate, vinyl propionate and vinyl stearate, unsaturated nitriles such as acrylonitrile, vinyl alkyl ethers such as vinyl methyl ester, vinyl ethyl ester, vinyl octyl ether and vinyl lauryl ether, halogenated vinylidenes such as vinylidene chloride, unsaturated fatty acids such as acrylic acid, methacrylic acid, itaconic acid, maleic acid, fumaric acid, maleic anhydride and itaconic anhydride and the anhydrides of the fatty acids, unsaturated fatty acid esters such as methyl acrylate, ethyl acrylate, monomethyl maleate, dimethyl maleate and butylbenzyl maleate, crosslinkable monomers such as diallyl phthalate, etc., may be used, and the vinyl-based monomer may be used alone or as a combination of two or more thereof.

The reaction may be performed by additionally injecting an additive such as 0.5 parts by weight to 2 parts by weight of an electrolyte, and 0.1 parts by weight to 1 part by weight of a molecular weight controller based on 100 parts by weight of the vinyl chloride-based monomer.

The electrolyte may be one or more selected from the group consisting of potassium chloride, sodium chloride, potassium bicarbonate, sodium carbonate, potassium carbonate, potassium hydrogen sulfite, sodium hydrogen sulfite, tetrapotassium pyrophosphate, tetrasodium pyrophosphate, tripotassium phosphate, trisodium phosphate, dipotassium hydrogen phosphate and disodium hydrogen phosphate. The electrolyte is not specifically limited, and may be, for example, one or more selected from the group consisting of potassium chloride, sodium chloride, potassium bicarbonate, sodium carbonate, potassium carbonate, potassium hydrogen sulfite, sodium hydrogen sulfite, tetrapotassium pyrophosphate, tetrasodium pyrophosphate, tripotassium phosphate, trisodium phosphate, dipotassium hydrogen phosphate and disodium hydrogen phosphate.

Here, the molecular weight controller is not specifically limited but may be, for example, n-butyl mercaptan, n-octyl mercaptan, n-dodecyl mercaptan, tert-dodecyl mercaptan, etc., and the electrolyte may be one or more selected from the group consisting of potassium chloride, sodium chloride, potassium bicarbonate, sodium carbonate, potassium carbonate, potassium hydrogen sulfite, sodium hydrogen sulfite, tetrapotassium pyrophosphate, tetrasodium pyrophosphate, tripotassium phosphate, trisodium phosphate, dipotassium hydrogen phosphate and disodium hydrogen phosphate. The electrolyte is not specifically limited, and may be, for example, one or more selected from the group consisting of potassium chloride, sodium chloride, potassium bicarbonate, sodium carbonate, potassium carbonate, potassium hydrogen sulfite, sodium hydrogen sulfite, tetrapotassium pyrophosphate, tetrasodium pyrophosphate, tripotassium phosphate, trisodium phosphate, dipotassium hydrogen phosphate and disodium hydrogen phosphate.

The reaction suppressor is not specifically limited, and may use, for example, paraquinone, hydroquinone, butylated hydroxytoluene, monomethyl ether hydroquinone, tert-butyl catechol, diphenylamine, triisopropanolamine, triethanolamine, etc.

In addition, the dispersant is not specifically limited, and may use, for example, higher alcohols such as lauryl alcohol, myristic alcohol and stearyl alcohol, or higher fatty acids such as lauryl acid, myristic acid, palmitic acid and stearic acid.

The homogenization is not specifically limited but may be performed by homogenizing at a temperature of 20° C. or less, preferably, a temperature of 5° C. to 15° C., using a homogenizer for 1 hour to 3 hours. In this case, the homogenizer is not specifically limited and common one well-known in the art may be used. For example, a rotor-stator type homogenizer may be used, and the total pressure of the homogenizer during homogenizing process may be 1000 psi to 2000 psi. In addition, a polymerization mixture may be distributed to the front part and rear part of the homogenizer for homogenization as necessary.

According to another embodiment of the present invention, there is provided a plastisol including 100 parts by weight of the vinyl chloride-based polymer; and 30 to 150 parts by weight of a plasticizer.

The vinyl chloride-based polymer according to the present invention may be a paste vinyl chloride-based polymer and may form a plastisol by mixing a foaming agent, a viscosity dropping agent, a thermal stabilizer, or other additives in addition to the plasticizer during processing to form a plastisol.

As the plasticizer, dioctyl phthalate, 2,2,4-trimethyl-1,3-pentanediol diisobutyrate, TXIB, etc., may be illustrated, as the foaming agent, aliphatic hydrocarbons such as propane, isobutane, n-butane, isopentane, and n-pentane; cyclic aliphatic hydrocarbons such as cyclohexane; halogenated hydrocarbon-based compounds; or a mixture thereof, may be illustrated, and as the thermal stabilizer, a Ba—Zn-based stearate may be illustrated. As the viscosity dropping agent or other additives, all materials generally used in the art may be applied.

The vinyl chloride-based polymer prepared according to the present invention has advantages in having excellent heat resistance and not inducing coloration due to heat during manufacturing a molded article such as a foam wall paper, and in having a broad foam processing range, and thus, may be widely used for wall papers, materials with high quality, leather processing, etc., of which thermal stability is important.

EXAMPLES

Hereinafter, the present invention will be explained in more detail referring to embodiments. However, the following embodiments are for illustrating the present invention, and the scope of the present invention is not limited thereto.

Example 1

To a high pressure reactor of 500 k, 0.01 parts by weight of sodium lauryl sulfate as a first emulsifier, and 0.06 parts by weight of potassium persulfate (KPS) were injected, and vacuum of −730 mmHg was applied to the reactor while stirring. To the reactor in a vacuum state, 100 parts by weight of a vinyl chloride monomer was injected, the temperature of the reactor was elevated to 50° C., and polymerization was performed. After initiating the polymerization, 1 part by weight of sodium lauryl sulfate was continuously injected as a second emulsifier for 8 hours to the reactor. After initiating the polymerization reaction and at a point where a polymerization conversion ratio was 0%, 0.02 parts by weight (200 ppm) of sodium carbonate ($Na_2CO_3$) based on 100 parts by weight of the vinyl chloride monomer was injected and the polymerization reaction was performed. The pH of a polymerization mixture before performing the polymerization was 8.1. After that, if the pressure of the reactor reached 4 kg/cm$^2$, the reaction was finished, and an unreacted vinyl chloride monomer was recovered and removed to prepare a vinyl chloride polymer. The vinyl chloride-based polymer thus prepared was sprayed and dried to obtain a vinyl chloride-based polymer in a particulate phase.

Example 2

A vinyl chloride-based polymer was prepared by the same method as in Example 1 except for injecting 0.08 parts by weight (800 ppm, pH 10.9) of sodium carbonate ($Na_2CO_3$) based on 100 parts by weight of the vinyl chloride monomer at a point where a polymerization conversion ratio was 0%.

Example 3

A vinyl chloride-based polymer was prepared by the same method as in Example 1 except for injecting 0.15 parts by weight (1,500 ppm, pH 11.5) of sodium carbonate ($Na_2CO_3$) based on 100 parts by weight of the vinyl chloride monomer at a point where a polymerization conversion ratio was 0%.

Comparative Example 1

A vinyl chloride-based polymer was prepared by the same method as in Example 1 except for not injecting sodium carbonate.

Comparative Example 2

A vinyl chloride-based polymer was prepared by the same method as in Example 1 except for injecting 0.009 parts by weight (90 ppm, pH 7.2) of sodium carbonate ($Na_2CO_3$) based on 100 parts by weight of the vinyl chloride monomer at a point where a polymerization conversion ratio was 0%.

Comparative Example 3

A vinyl chloride-based polymer was prepared by the same method as in Example 1 except for injecting 0.009 parts by weight (90 ppm, pH 11.2) of sodium hydroxide (NaOH) based on 100 parts by weight of the vinyl chloride monomer at a point where a polymerization conversion ratio was 0%.

Experimental Example 1: NMR Analysis Results on Vinyl Chloride-Based Polymer NMR analysis was conducted for the vinyl chloride polymers prepared in the Examples and Comparative Examples, and the results are shown in Table 1 below.

1) Measurement of pH

After spray drying latex, 30 g of a polymer powder obtained and 70 g of deionized water were mixed, and measurement was conducted using a pH detector (Mettler Toledo Co., Seven compact Model).

2) NMR Analysis

A specimen was dissolved in a tetrahydrofuan solvent (THF-d8), NMR 1H spectrum was measured using an analysis apparatus, Bruker Avance III HD 700 MHz NMR at room temperature. Considering the PVC defect content, scanning was performed for 1,000 times or more, calculation was conducted based on the integration value of 1H NMR spectrum, and the number of defects per 1000 vinyl carbon atoms are shown.

TABLE 1

| | pH of latex | Olefin-type defects | | | | | Chloro-type defects | | | | | |
|---|---|---|---|---|---|---|---|---|---|---|---|---|
| | | $N_O$ | $N_{OC}$ | $N_{OT}$ | $N_{OI}$ | $R_{OT}$ | $N_C$ | $N_{CR}$ | $N_{CM}$ | $N_{CT}$ | $N_{CB}$ | $R_{CM}$ |
| Example 1 | 7.3 | 1.34 | 0.43 | 0.63 | 0.28 | 0.47 | 9.85 | 2.76 | 2.70 | 3.67 | 0.72 | 0.27 |
| Example 2 | 10.3 | 0.99 | 0.32 | 0.60 | 0.07 | 0.60 | 9.44 | 2.80 | 2.28 | 3.74 | 0.62 | 0.24 |
| Example 3 | 11.0 | 0.95 | 0.30 | 0.59 | 0.06 | 0.62 | 9.56 | 2.81 | 2.31 | 3.80 | 0.64 | 0.24 |

TABLE 1-continued

| | pH of latex | Olefin-type defects | | | | | Chloro-type defects | | | | | |
|---|---|---|---|---|---|---|---|---|---|---|---|---|
| | | $N_O$ | $N_{OC}$ | $N_{OT}$ | $N_{OI}$ | $R_{OT}$ | $N_C$ | $N_{CR}$ | $N_{CM}$ | $N_{CT}$ | $N_{CB}$ | $R_{CM}$ |
| Comparative Example 1 | 2.5 | 1.94 | 0.56 | 0.72 | 0.66 | 0.37 | 12.49 | 4.04 | 2.29 | 5.34 | 0.82 | 0.18 |
| Comparative Example 2 | 5.4 | 1.7 | 0.5 | 0.69 | 0.51 | 0.41 | 12.09 | 3.95 | 2.29 | 5.06 | 0.79 | 0.19 |
| Comparative Example 3 | 10.6 | 1.63 | 0.49 | 0.69 | 0.45 | 0.42 | 12.06 | 4.02 | 2.27 | 5.03 | 0.74 | 0.19 |

Referring to Table 1, it could be confirmed that the vinyl chloride-based polymers of Examples 1 to 3, prepared by injecting a carbonate-based metal salt had the number of olefin-type defects of 1.5 or less and the number of chloro-type defects of 11.0 or less. However, it could be confirmed that in the Comparative Examples not using the carbonate-based metal salt, the umber of olefin-type defects was greater than 1.5, and the number of chloro-type defects was greater than 11.0.

Particularly, it could be confirmed that the inner olefin defects ($N_{OI}$) among the olefin-type defects were significantly decreased when compared with Comparative Examples 1 and 2, the ratio of pseudo-terminal trans-type defects among the olefin-type defects was higher when compared with Comparative Examples 1 and 2, and the ratio of terminal symmetry-type chloro defects among the chloro-type defects was high when compared with Comparative Examples 1 and 2.

In addition, the pH of the polymerization mixture was controlled to 8 or more, but it was confirmed that in case where the pH was controlled through not by the carbonate-based metal salt but by sodium hydroxide as in Comparative Example 3, there was no decrease of the defects of the vinyl chloride-based polymer.

Overall, it was confirmed that the number of defects in a final vinyl chloride-based polymer could be decreased if the vinyl chloride-based polymer was prepared by controlling the pH of the polymer mixture to 8 or more by suitably controlling the injection amount and injection point of the carbonate-based metal salt as one method. Further, it was confirmed that the inner olefin defects may particularly be decreased, and the ratio of the pseudo-terminal trans-type defects and the terminal symmetry-type chloro defects could be maintained high.

Experimental Example 2: Evaluation of Heat Resistance of Plastisol

By using the vinyl chloride polymers prepared in the Examples and Comparative Examples, plastisols were prepared by stirring 100 g of a vinyl chloride polymer and 60 g of diisononyl phthalate (DINP) in 800 rpm for 10 minutes using a mixer (Eurostar IKA), and each plastisol thus prepared was applied on a release paper, coated using a bar with 0.5 mm, and dried in a Mathis oven at 150° C. for 45 seconds to manufacture a pregelling sheet. The heat resistance of the sheet was evaluated by a method below, and the results are shown in Table 2 below.

Evaluation of Heat Resistance (Yellow Index: Y.I.)

To each sheet thus manufactured, heat of 205° C. was applied, and the change with the passage of time was measured for 5 minutes as yellow index (Y.I.) using a colorimeter (KONICA MINOLTA, CM-700d).

TABLE 2

| | Yellow index |
|---|---|
| Example 1 | 83.5 |
| Example 2 | 65.4 |
| Example 3 | 66.3 |
| Comparative Example 1 | 113.4 |
| Comparative Example 2 | 102.8 |
| Comparative Example 3 | 98.9 |

Referring to Table 2 above, in Examples 1 to 3, prepared by the preparation method according to the present invention, the yellow index was measured low considering the decrease of the number of olefin-type defects and chloro-type defects. Through the results, it could be confirmed that thermal stability was significantly improved. On the contrary, in Comparative Examples 1 to 3, the number of olefin-type defects and chloro-type defects were still a lot, and it was confirmed that no improving effects of thermal stability was found, and the thermal stability was inferior by up to about 2 times when compared with the Examples.

That is, it could be confirmed that the defects of the vinyl chloride-based polymer may be decreased through utilizing a carbonate-based metal salt, and as a result, the thermal stability of the vinyl chloride-based polymer may be improved.

The invention claimed is:

1. A vinyl chloride-based polymer, having a pH of 7 to 11 and satisfying the following Formulae 1 and 2:

$N_O \leq 1.5$            [Formula 1]

$N_C \leq 11.0$           [Formula 2]

in Formulae 1 and 2,
$N_O$ is a number of olefin-type defects per 1,000 vinyl carbon atoms in the polymer,
$N_C$ is a number of chloro-type defects per 1,000 vinyl carbon atoms in the polymer, and
$N_O$ and $N_C$ are values calculated by integrating peaks derived by NMR analysis,
wherein the vinyl chloride-based polymer is prepared by polymerizing a polymerization mixture comprising water, an initiator, an emulsifier, a vinyl chloride monomer and a carbonate-based metal salt,
wherein a pH of the polymerization mixture is 8 or higher,
wherein the carbonate-based metal salt is injected in an initial stage of polymerization, and the initial stage of polymerization is from a point before initiating the polymerization to a point where a polymerization conversion ratio reaches 10%, and
wherein the carbonate-based metal salt is injected in an amount of 100 to 1500 ppm based on the total weight of the vinyl chloride monomer.

2. The vinyl chloride-based polymer according to claim 1, further satisfying the following Formula 3:

$$R_{OT} \geq 0.45 \quad \text{[Formula 3]}$$

in Formula 3, $R_{OT}$ is a ratio ($N_{OT}/N_O$) of a number of pseudo-terminal trans-type defects ($N_{OT}$) with respect to the number of olefin-type defects per 1,000 vinyl carbon atoms in the polymer ($N_O$), and $N_O$ and $N_{OT}$ are values calculated by integrating peaks derived by NMR analysis.

3. The vinyl chloride-based polymer according to claim 1, further satisfying the following Formula 4:

$$R_{CM} \geq 0.22 \quad \text{[Formula 4]}$$

in Formula 4, $R_{CM}$ is a ratio (NcM/Nc) of a number of terminal symmetry-type chloro defects ($N_{CM}$) with respect to the number of chloro-type defects per 1,000 vinyl carbon atoms in the polymer ($N_C$), and $N_C$ and $N_{CM}$ are values calculated by integrating peaks derived by NMR analysis.

4. The vinyl chloride-based polymer according to claim 1, wherein the olefin-type defects comprise inner olefin defects, pseudo-terminal trans-type defects, pseudo-terminal cis-type defects and terminal olefin defects.

5. The vinyl chloride-based polymer according to claim 1, wherein the chloro-type defects comprise branch-type chloro defects, terminal symmetry-type chloro defects, terminal asymmetry-type chloro defects and terminal chloro defects.

6. The vinyl chloride-based polymer according to claim 1, wherein the vinyl chloride-based polymer is a paste vinyl chloride-based polymer.

7. A plastisol comprising 100 parts by weight of the vinyl chloride-based polymer of claim 1; and 30 to 150 parts by weight of a plasticizer.

8. A method for preparing a vinyl chloride-based polymer, the method comprising:
 a step of polymerizing a polymerization mixture comprising water, an initiator, an emulsifier, a vinyl chloride monomer and a carbonate-based metal salt,
 wherein a pH of the polymerization mixture is 8 or higher,
 wherein the carbonate-based metal salt is injected in an initial stage of polymerization, and the initial stage of polymerization is from a point before initiating the polymerization to a point where a polymerization conversion ratio reaches 10%, and
 wherein the carbonate-based metal salt is injected in an amount of 100 to 1500 ppm based on the total weight of the vinyl chloride monomer.

9. The method for preparing a vinyl chloride-based polymer according to claim 8, wherein the carbonate-based metal salt is one or more selected from the group consisting of $Na_2CO_3$, $NaHCO_3$ and $K_2CO_3$.

10. The method for preparing a vinyl chloride-based polymer according to claim 8, wherein the carbonate-based metal salt is injected after initiating the polymerization and at a point where a polymerization conversion ratio is 0% to 10%.

* * * * *